United States Patent
Hua et al.

(10) Patent No.: US 12,218,699 B2
(45) Date of Patent: Feb. 4, 2025

(54) RECEIVER CIRCUIT AND RECEIVER CIRCUIT CONTROL METHOD

(71) Applicants: Beijing ESWIN Computing Technology Co., Ltd., Beijing (CN); Hefei ESWIN Computing Technology Co., Ltd., Hefei Anhui (CN)

(72) Inventors: Zhengbei Hua, Beijing (CN); Dongmyung Lee, Beijing (CN); Jangjin Nam, Beijing (CN); Donghoon Baek, Beijing (CN); Hao Fan, Beijing (CN)

(73) Assignees: BEIJING ESWIN COMPUTING TECHNOLOGY CO., LTD., Beijing (CN); HEFEI ESWIN COMPUTING TECHNOLOGY CO., LTD., Hefei (CN)

( * ) Notice: Subject to any disclaimer, the term of this patent is extended or adjusted under 35 U.S.C. 154(b) by 168 days.

(21) Appl. No.: 18/003,724

(22) PCT Filed: Dec. 1, 2021

(86) PCT No.: PCT/CN2021/134776
§ 371 (c)(1),
(2) Date: Dec. 29, 2022

(87) PCT Pub. No.: WO2022/135086
PCT Pub. Date: Jun. 30, 2022

(65) Prior Publication Data
US 2023/0231590 A1  Jul. 20, 2023

(30) Foreign Application Priority Data
Dec. 22, 2020 (CN) .......................... 202011527021.0

(51) Int. Cl.
H04B 1/18 (2006.01)
H04L 41/0896 (2022.01)

(52) U.S. Cl.
CPC ............ *H04B 1/18* (2013.01); *H04L 41/0896* (2013.01)

(58) Field of Classification Search
CPC .......... H04B 1/18; H04B 1/16; H04L 41/0896
See application file for complete search history.

(56) References Cited

U.S. PATENT DOCUMENTS

| 4,771,249 | A |   | 9/1988 | Burch et al. |
| 5,432,813 | A | * | 7/1995 | Barham ................. H04B 1/707 380/34 |

(Continued)

FOREIGN PATENT DOCUMENTS

| CA | 2628017 A1 | * | 7/2007 | ............. H03F 3/505 |
| CA | 2847649 A1 | * | 7/2007 | ............. H03F 3/505 |

(Continued)

OTHER PUBLICATIONS

International Search Report for Application No. PCT/CN2021/134776 mailed Feb. 10, 2022, pp. 1-5.

*Primary Examiner* — Berhanu Tadese
(74) *Attorney, Agent, or Firm* — Ladas & Parry, LLP

(57) ABSTRACT

The present disclosure provides a receiver circuit and a receiver circuit control method. In the present disclosure, the input data is detected by a detection circuit to obtain a data rate detection result, and the bandwidth of the receiver is automatically adjusted according to the data rate detection result.

15 Claims, 2 Drawing Sheets

(56) References Cited

U.S. PATENT DOCUMENTS

| | | | | |
|---|---|---|---|---|
| 5,760,702 A * | 6/1998 | Ito | H04B 7/26 | 375/345 |
| 6,130,602 A * | 10/2000 | O'Toole | G06K 7/10059 | 342/51 |
| 6,285,722 B1 | 9/2001 | Banwell et al. | | |
| 6,526,113 B1 * | 2/2003 | Gutierrez | H03L 7/18 | 331/25 |
| 6,631,144 B1 | 10/2003 | Johansen | | |
| 6,721,289 B1 * | 4/2004 | O'Toole | H01Q 1/2225 | 342/51 |
| 6,734,797 B2 * | 5/2004 | Shanks | G08B 13/2485 | 340/572.1 |
| 6,748,041 B1 * | 6/2004 | Gutierrez | H03L 7/0891 | 331/25 |
| 7,103,131 B1 * | 9/2006 | Byran | H03L 7/091 | 375/375 |
| 7,170,867 B2 * | 1/2007 | O'Toole | G06K 19/07749 | 342/51 |
| 7,196,545 B1 * | 3/2007 | Groen | H03K 3/356 | 326/46 |
| 7,285,994 B2 * | 10/2007 | Dalton | H03L 7/087 | 327/12 |
| 7,541,852 B2 * | 6/2009 | Johnson | H03K 5/1565 | 327/175 |
| 7,583,179 B2 * | 9/2009 | Wu | G06K 7/0008 | 340/572.1 |
| 8,019,225 B2 * | 9/2011 | Daghighian | H04B 10/40 | 398/164 |
| 8,179,879 B2 * | 5/2012 | Ivry | H04J 3/0682 | 370/242 |
| 8,498,533 B2 * | 7/2013 | Ivry | H04J 3/0682 | 398/9 |
| 8,666,257 B2 * | 3/2014 | Daghighian | H04B 10/40 | 398/140 |
| 8,710,882 B2 * | 4/2014 | Zhang | H03L 7/0891 | 327/156 |
| 8,928,416 B2 * | 1/2015 | Zhao | H03L 7/0995 | 331/10 |
| 8,964,920 B2 * | 2/2015 | Huang | H04L 25/49 | 375/355 |
| 9,160,582 B1 * | 10/2015 | Huss | H04L 7/033 | |
| 9,178,551 B2 * | 11/2015 | Vigraham | H04B 1/69 | |
| 9,276,592 B2 * | 3/2016 | Lin | H03L 7/0807 | |
| 9,306,676 B1 * | 4/2016 | Castrillon | H04L 1/0054 | |
| 9,325,490 B2 * | 4/2016 | Tiwari | H04L 7/0331 | |
| 9,496,967 B1 * | 11/2016 | Castrillon | H04L 1/0054 | |
| 9,806,823 B2 * | 10/2017 | Castrillon | H04L 1/0045 | |
| 9,979,571 B2 * | 5/2018 | Wang | H04L 25/066 | |
| 10,069,656 B1 * | 9/2018 | Huss | H04B 17/309 | |
| 10,135,604 B1 * | 11/2018 | Dehlaghi | H04L 7/0334 | |
| 10,141,963 B2 * | 11/2018 | Yoo | H04B 1/123 | |
| 10,164,806 B2 * | 12/2018 | Jang | H04L 7/042 | |
| 10,341,030 B2 * | 7/2019 | Castrillon | H04B 10/616 | |
| 10,461,920 B2 * | 10/2019 | Chan | H04L 7/0331 | |
| 10,461,969 B2 * | 10/2019 | Wang | H04L 25/4917 | |
| 10,693,589 B2 * | 6/2020 | Nir | H04L 1/0047 | |
| 10,728,015 B1 | 7/2020 | Hormis et al. | | |
| 10,728,063 B2 * | 7/2020 | Wang | H04L 5/0048 | |
| 10,826,677 B2 * | 11/2020 | Chan | H04L 7/0331 | |
| 10,861,375 B2 * | 12/2020 | Lim | G09G 3/2092 | |
| 11,018,907 B2 * | 5/2021 | Wang | H04L 5/0048 | |
| 11,063,637 B2 * | 7/2021 | Yousefi | H04B 5/266 | |
| 11,107,443 B2 * | 8/2021 | Kim | G09G 5/008 | |
| 11,298,009 B2 * | 4/2022 | Park | H04B 13/005 | |
| 11,450,263 B2 * | 9/2022 | Lim | G09G 3/2092 | |
| 11,539,369 B2 * | 12/2022 | Lin | H03L 7/0816 | |
| 11,607,120 B2 * | 3/2023 | Oh | H04B 13/005 | |
| 2004/0190669 A1 * | 9/2004 | Gutierrez | H03L 7/093 | 375/376 |
| 2008/0069562 A1 * | 3/2008 | Ivry | H04J 3/0682 | 398/52 |
| 2008/0157841 A1 * | 7/2008 | Johnson | H03K 5/003 | 327/175 |
| 2012/0213506 A1 * | 8/2012 | Ivry | H04J 3/0682 | 398/17 |
| 2013/0063193 A1 * | 3/2013 | Zhang | H03L 7/0891 | 327/157 |
| 2014/0146413 A1 * | 5/2014 | Xia | G11B 20/10268 | 360/48 |
| 2014/0149629 A1 * | 5/2014 | Cranford, Jr. | G06F 13/423 | 710/313 |
| 2014/0253535 A1 * | 9/2014 | Lim | G09G 3/20 | 345/213 |
| 2015/0188697 A1 * | 7/2015 | Lin | H03L 7/0807 | 375/375 |
| 2017/0111071 A1 * | 4/2017 | Yoo | H04B 1/123 | |
| 2017/0132966 A1 * | 5/2017 | Lim | G09G 5/008 | |
| 2017/0264470 A1 * | 9/2017 | Wang | H04L 25/4917 | |
| 2017/0317739 A1 | 11/2017 | Emmanuel et al. | | |
| 2018/0006849 A1 * | 1/2018 | Jang | H04L 25/03273 | |
| 2018/0152280 A1 * | 5/2018 | Chan | H04L 7/0331 | |
| 2018/0287831 A1 * | 10/2018 | Wang | H04L 25/4917 | |
| 2020/0145262 A1 * | 5/2020 | Wang | H04L 27/0002 | |
| 2020/0374160 A1 * | 11/2020 | Wang | H04L 5/0048 | |
| 2021/0118356 A1 * | 4/2021 | Lim | G09G 5/006 | |
| 2022/0360266 A1 * | 11/2022 | Lin | H03L 7/095 | |
| 2023/0095927 A1 * | 3/2023 | Choi | H04N 5/52 | 725/151 |
| 2023/0231590 A1 * | 7/2023 | Hua | H04B 1/16 | 375/262 |
| 2024/0056060 A1 * | 2/2024 | D'Addato | H03M 1/0604 | |

FOREIGN PATENT DOCUMENTS

| | | | | |
|---|---|---|---|---|
| CA | 2847650 A1 * | 7/2007 | H03F 3/505 | |
| CA | 2847651 A1 * | 7/2007 | H03F 3/505 | |
| CA | 2933452 A1 * | 7/2007 | H03F 3/505 | |
| CA | 2512241 C * | 5/2012 | H03D 13/003 | |
| CA | 2847651 C * | 2/2018 | H03F 3/505 | |
| CN | 1129501 A * | 8/1996 | H04B 7/26 | |
| CN | 1290443 A | 4/2001 | | |
| CN | 1075691 C * | 11/2001 | H04B 7/26 | |
| CN | 1435016 A | 8/2003 | | |
| CN | 100379274 C * | 4/2008 | H04N 21/42638 | |
| CN | 101394181 A * | 3/2009 | | |
| CN | 102055443 A * | 5/2011 | | |
| CN | 102393531 A * | 3/2012 | | |
| CN | 103106379 A * | 5/2013 | | |
| CN | 102055443 B * | 1/2014 | | |
| CN | 104036753 A * | 9/2014 | G09G 3/20 | |
| CN | 104144344 A * | 11/2014 | | |
| CN | 104811190 A * | 7/2015 | | |
| CN | 105099447 A * | 11/2015 | H03L 7/0995 | |
| CN | 104144344 B * | 5/2017 | | |
| CN | 107343289 A | 11/2017 | | |
| CN | 104811190 B * | 12/2017 | | |
| CN | 104978290 B * | 4/2018 | | |
| CN | 105099447 B * | 11/2018 | H03L 7/0995 | |
| CN | 109565481 A * | 4/2019 | G01R 25/00 | |
| CN | 111199702 A * | 5/2020 | G09G 3/035 | |
| CN | 112241384 A * | 1/2021 | G06F 13/4072 | |
| CN | 112313881 A * | 2/2021 | H03M 9/00 | |
| CN | 112636748 A * | 4/2021 | H03L 7/0805 | |
| CN | 112688701 A * | 4/2021 | H04B 1/18 | |
| CN | 112313881 B * | 11/2021 | H03M 9/00 | |
| CN | 112688701 B * | 5/2022 | H04B 1/18 | |
| CN | 112241384 B * | 7/2022 | G06F 13/4072 | |
| CN | 115499004 A * | 12/2022 | G09G 5/008 | |
| CN | 115512636 A * | 12/2022 | G09G 3/006 | |
| CN | 112636748 B * | 11/2023 | H03L 7/0805 | |
| CN | 117478157 A * | 1/2024 | H03K 3/0233 | |
| CN | 118199663 A * | 6/2024 | | |
| DE | 69534154 T2 * | 9/2005 | H04B 7/26 | |
| EP | 4145705 A1 * | 3/2023 | G06F 1/10 | |
| EP | 4312378 A1 * | 1/2024 | H03K 5/082 | |
| EP | 3739759 B1 * | 3/2024 | G06F 11/1008 | |
| JP | 4955781 B2 * | 6/2012 | H03L 7/189 | |
| JP | 6086639 B1 * | 3/2017 | G09G 5/008 | |
| JP | 2017204790 A * | 11/2017 | G09G 5/008 | |
| TW | 201439779 A * | 10/2014 | G09G 3/20 | |
| TW | 201526628 A * | 7/2015 | G09G 5/008 | |

(56) References Cited

FOREIGN PATENT DOCUMENTS

| WO | 9100655 A1 | 1/1991 |
| WO | WO-9534962 A1 * | 12/1995 |
| WO | WO-0119005 A1 * | 3/2001 |
| WO | WO-02065380 A2 * | 8/2002 |
| WO | WO-2004066074 A2 * | 8/2004 |
| WO | WO-2016099846 A1 * | 6/2016 |
| WO | WO-2021177479 A1 * | 9/2021 |
| WO | WO-2022135086 A1 * | 6/2022 |

\* cited by examiner

RECEIVER CIRCUIT AND RECEIVER CIRCUIT CONTROL METHOD

CROSS-REFERENCE TO RELATED APPLICATIONS

The present disclosure is a U.S. National Phase Application that claims priority to PCT/CN2021/134776 filed Dec. 1, 2021, which claims priority to Chinese Patent Application No. 202011527021.0, filed with the China National Intellectual Property Administration (CNIPA) on Dec. 22, 2020, the entirety of these disclosures are incorporated herein by reference.

TECHNICAL FIELD

The present disclosure relates to the technical field of receiver devices, and in particular to a receiver circuit and a receiver circuit control method.

BACKGROUND

To support various types of application products, an increasing number of display interface protocols cover a wide range of data rates. Receivers that support a wide range of data rates need to support these display interface protocols. For power consumption and energy efficiency, the receivers need to set different bandwidths according to the data rates of different input data. The larger the required bandwidth, the more current consumed. In the receiver, the analog front-end (AFE) amplifies a small signal from a channel into a large signal and passes it to the clock & data recovery (CDR) circuit. Generally, there are two common ways to control the bandwidth of a receiver. One is to control the bandwidth of the receiver by chip pins (PINs). The other is to control the bandwidth of the receiver by sending an information package to a display driver chip by a timing controller (TCON). However, the control method by PINs will need additional chip pins, and the package control method will be limited by TCON. It is difficult to optimize the performance of the display driver chip.

SUMMARY

The present disclosure provides a receiver circuit and a receiver circuit control method.

According to a first aspect of the present disclosure, the present disclosure provides a receiver circuit, including: an analog front-end, configured to output a first signal; a clock & data recovery circuit, connected to the analog front-end and configured to lock the frequency of the first signal and output a frequency locking signal; and a detection circuit, respectively connected to the analog front-end and the clock recovery circuit, and configured to detect a data rate according to the frequency locking signal and output a bandwidth signal, a bias signal, and a completion signal according to the data rate detection result; wherein the bandwidth signal is used to adjust the bandwidth of the clock & data recovery circuit, the bias signal is used to adjust the bandwidth of the analog front-end, and the completion signal is used to control the clock & data recovery circuit to lock the phase of the first signal.

In some embodiments, the detection circuit includes: a first flip-flop, configured to output a second signal according to a power supply voltage signal, the first signal and the frequency locking signal; a first logic gate, which outputs a third signal according to the second signal and an inverted signal; a timing circuit, which outputs a fourth signal according to the third signal; a second flip-flop, which outputs the completion signal according to the power supply voltage signal, the fourth signal, and the second signal; an inverter, which outputs the inverted signal according to the completion signal; a second logic gate, which outputs a clock count signal according to the first signal, the second signal, and the inverted signal; and a counter, which outputs a count value according to the clock count signal and the second signal, the count value is used to look up a table to obtain parameters of the bandwidth signal and the bias signal.

In some embodiments, the timing circuit includes: a drive circuit, an input end of which is connected to the third signal; a capacitor, one end of which is connected to an output end of the drive circuit and the other end of which is connected to a ground signal; a voltage source, one end of which is connected to the ground signal; and a comparator, a first input end of which is connected to the other end of the voltage source, and a second input end of which is connected to an output end of the drive circuit.

In some embodiments, the drive circuit includes: a current source, one end of which is connected to the power supply voltage signal; and a first switch transistor and a second switch transistor, the gate of the first switch transistor and the gate of the second switch transistor being the input ends, the source of the first switch transistor and the drain of the second switch transistor being the output ends, the drain of the first switch transistor being connected to the other end of the current source, and the source of the second switch transistor being connected to the ground signal.

In some embodiments, the first switch transistor is a PMOS transistor and the second switch transistor is an NMOS transistor.

In some embodiments, when the third signal is at a first level, the first switch transistor is turned on, the second switch transistor is turned off, and the capacitor starts charging; and when the third signal is at a second level, the first switch transistor is turned off, the second switch transistor is turned on, and the capacitor starts discharging.

In some embodiments, when the second signal is at a first level, the counter outputs a first count value which is used to obtain the bandwidth level of the bandwidth signal; and when the second signal is at a second level, the counter starts counting and outputs a count value.

According to a second aspect of the present disclosure, the present disclosure provides a receiver circuit control method, including: receiving a frequency locking signal output by a clock & data recovery circuit; detecting a data rate according to the frequency locking signal; and outputting a bandwidth signal, a bias signal and a completion signal according to the data rate detection result, wherein the bandwidth signal is used to adjust the bandwidth of the clock & data recovery circuit, the bias signal is used to adjust the bandwidth of the analog front-end, and the completion signal is used to control the clock & data recovery circuit to lock the phase of the first signal.

In some embodiments, the method further includes: when the completion signal is at a second level, cutting off the circuit path of the detection circuit.

DETAILED DESCRIPTION

The technical solutions in the embodiments of the present disclosure will be clearly and completely described below with reference to the drawings in the embodiments of the present disclosure. Apparently, the embodiments to be described are merely some embodiments of the present disclosure rather than all embodiments. Based on the embodiments of the present disclosure, all other embodiments obtained by a person of ordinary skill in the art without paying any creative effort should be included in the protection scope of the present disclosure.

Figure 1:
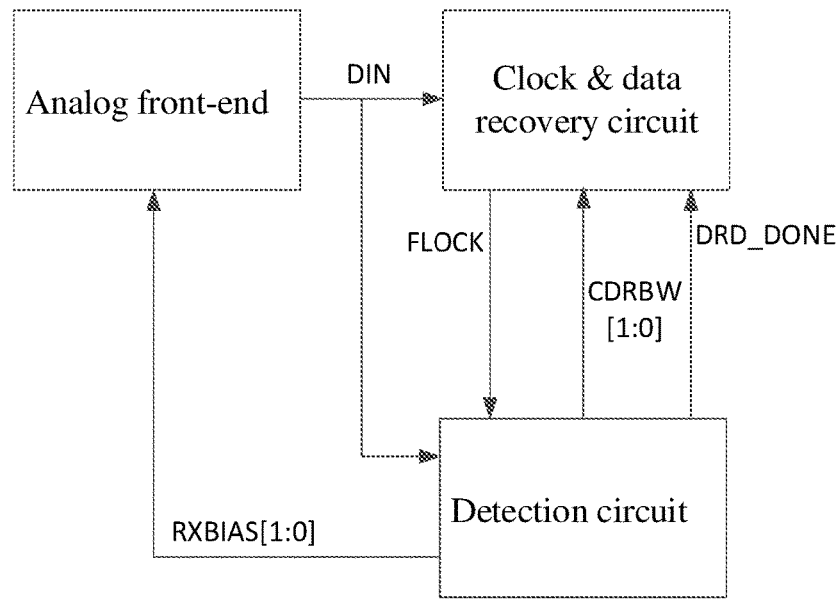
FIG. 1 is a schematic structure diagram of a receiver circuit according to an embodiment of the present disclosure.

As shown in FIG. 1, an embodiment of the present disclosure provides a receiver circuit, including an analog front-end 11, a clock & data recovery circuit 12, and a detection circuit 13.

The analog front-end 11 is configured to output a first signal.

The clock & data recovery circuit 12 is connected to the analog front-end. The clock & data recovery circuit 12 is configured to lock the frequency of the first signal and output a frequency locking signal.

The detection circuit 13 is respectively connected to the analog front-end 11 and the clock & data recovery circuit 12. The detection circuit 13 is configured to detect a data rate according to the frequency locking signal and output a bandwidth signal, a bias signal, and a completion signal according to the data rate detection result. Wherein, the bandwidth signal is used to adjust the bandwidth of the clock & data recovery circuit 12, the bias signal is used to adjust the bandwidth of the analog front-end 11, and the completion signal is used to control the clock & data recovery circuit 12 to lock the phase of the first signal. When the frequency locking signal is at a first level (low level), the detection circuit is reset; and when the frequency locking signal is at a second level (high level), the detection circuit detects the data rate.

Figure 2:
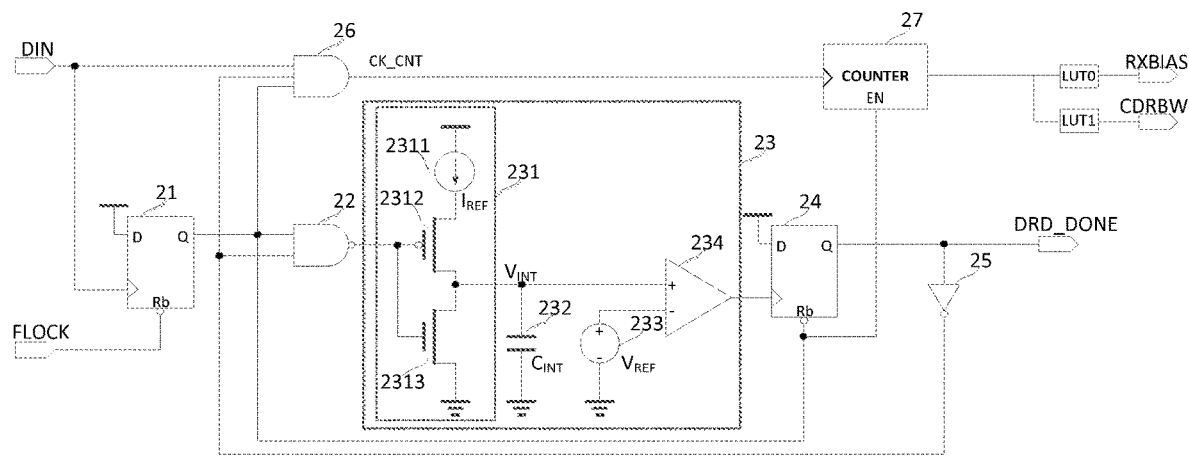
FIG. 2 is a schematic structure diagram of a detection circuit according to an embodiment of the present disclosure.

Referring to FIG. 2, an embodiment of the present disclosure provides a detection circuit, including: a first flip-flop 21, a first logic gate 22, a timing circuit 23, a second flip-flop 24, an inverter 25, a second logic gate 26, and a counter 27.

The first flip-flop 21 is configured to output a second signal according to a power supply voltage signal, the first signal, and the frequency locking signal.

The first logic gate 22 outputs a third signal according to the second signal and an inverted signal.

The timing circuit 23 outputs a fourth signal according to the third signal.

The timing circuit 23 includes: a drive circuit 231, a capacitor 232, a voltage source 233, and a comparator 234.

An input end of the drive circuit 231 is connected to the third signal. The drive circuit 231 includes: a current source 2311, a first switch transistor 2312, and a second switch transistor 2313. One end of the current source 231 is connected to the power supply voltage signal. The gate of the first switch transistor 2312 and the gate of the second switch transistor 2313 are the input ends, and the source of the first switch transistor 2312 and the drain of the second switch transistor 2313 are the output ends, the drain of the first switch transistor 2312 is connected to the other end of the current source 2311, and the source of the second switch transistor 2313 is connected to a ground signal.

In some embodiments, the first switch transistor 2312 is a PMOS transistor, and the second switch transistor 2313 is an NMOS transistor.

When the third signal is at the first level, the first switch transistor is turned on, the second switch transistor is turned off, and the capacitor starts charging; and when the third signal is at the second level, the first switch transistor is turned off, the second switch transistor is turned on, and the capacitor starts discharging.

One end of the capacitor 232 is connected to the output end of the drive circuit 231, and the other end of the capacitor 232 is connected to the ground signal.

One end of the voltage source 233 is connected to the ground signal.

A first input end of the comparator 234 is connected to the other end of the voltage source 233, and the second input end of the comparator 234 is connected to the output end of the drive circuit 231.

The second flip-flop 24 outputs the completion signal according to the power supply voltage signal, the fourth signal, and the second signal.

The inverter 25 outputs the inverted signal according to the completion signal.

The second logic gate 26 outputs a clock count signal according to the first signal, the second signal, and the inverted signal.

The counter 27 outputs a count value according to the clock count signal and the second signal. The count value is used to look up a table to obtain parameters of the bandwidth signal CDRBW and the bias signal RXBIAS. When the second signal is at the first level, the counter outputs a first count value which is used to obtain the bandwidth level of the bandwidth signal; and when the second signal is at the second level, the counter starts counting and outputs a count value FREQ. The values of the bias signal RXBIAS and the bandwidth signal CDRBW are obtained through LUT0 and LUT1 of a look-up table (LUT) circuit, so as to realize the functions of Table 1 below.

In an embodiment of the present disclosure, when the second signal is at the first level (low level), the enable end EN of the counter COUNTER is at the low level, so that the output value from the counter can be used to obtain the maximum bandwidth level of the wideband signal by looking up the table and output a bias signal. When the second signal is at the second level (high level), the counter starts counting. The count value is incremented by 1 every time one clock signal cycle passes. The final count value is output.

Figure 3:
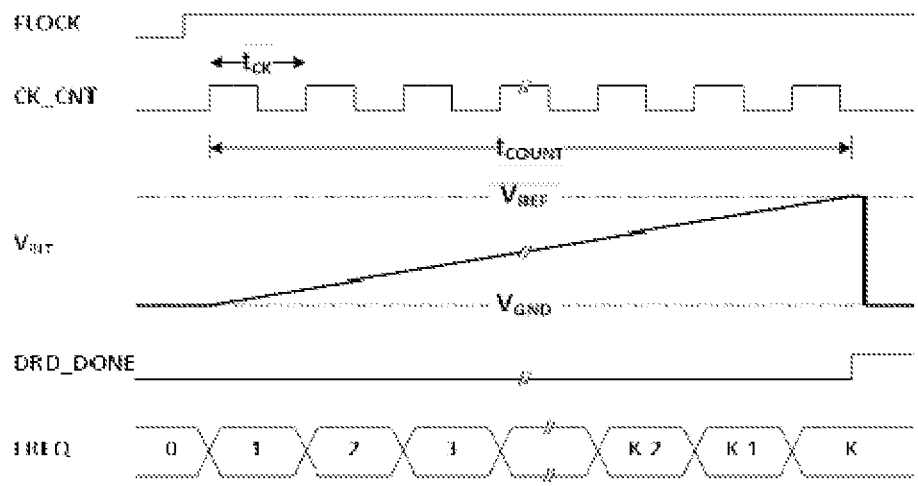
FIG. 3 is a timing sequence diagram of a receiver circuit according to an embodiment of the present disclosure.

Referring to FIG. 3, the present disclosure provides a timing sequence diagram of a receiver circuit.

When the frequency locking signal FLOCK is at the first level (low level), the detection circuit is reset ($V_{INT}$ is pulled to $V_{GND}$), and RXBIAS is pulled to the maximum bandwidth level, to ensure that the maximum data rate can work normally.

When the frequency locking signal FLOCK is at the second level (high level), the counter starts counting. At the same time, the integrator capacitor ($C_{INT}$) is charged by the reference current ($I_{REF}$) and the integrator voltage ($V_{INT}$) starts increasing.

Once $V_{INT}$ reaches the reference voltage ($V_{REF}$), the fourth signal output by the comparator 234 changes from low level to high level, the detection circuit ends work (the completion signal DRD_DONE is pulled high), the counter stops counting and outputs the last value.

The value output by the counter is determined by the input frequency. According to the corresponding information table shown in Table 1, the values of RXBIAS and CDRBW may be set.

TABLE 1

| $f_{DATA}$ | $t_{CK}$ | K | RXBIAS | AFE bias current ratio |
|---|---|---|---|---|
| 2.0 | 5.00 | 100 | LL | 100% |
| 1.6 | 6.25 | 80 | LH | 80% |
| 1.2 | 8.33 | 60 | HL | 60% |
| 0.8 | 12.5 | 40 | HH | 40% |

Figure 4:
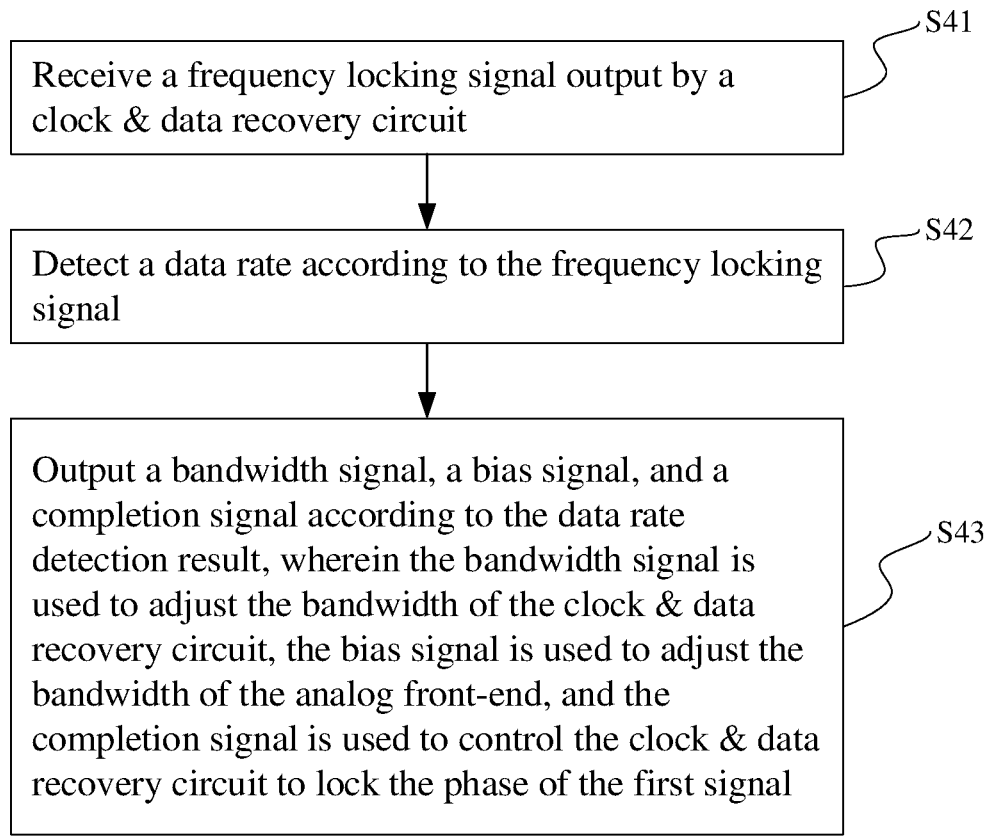
FIG. 4 is a schematic flowchart of steps of a receiver circuit control method according to an embodiment of the present disclosure.

As shown in FIG. 4, the present disclosure provides a receiver circuit control method, including steps S41 to S43.

S41: receiving a frequency locking signal output by a clock & data recovery circuit.

S42: detecting a data rate according to the frequency locking signal.

S43: outputting a bandwidth signal, a bias signal, and a completion signal according to the data rate detection result, wherein the bandwidth signal is used to adjust the bandwidth of the clock & data recovery circuit, the bias signal is used to adjust the bandwidth of the analog front-end, and the completion signal is used to control the clock & data recovery circuit to lock the phase of the first signal.

In some embodiments, when the completion signal is at a second level, the circuit path of the detection circuit is cut off to reduce power consumption.

The detection circuit controls not only the values of the bias signal and the bandwidth signal, but also circuit parameters related to the input data rate, such as power consumption, bias current of a voltage-controlled delay oscillator, and locking time of the CDR, etc.

In the present disclosure, the input data is detected by the detection circuit to obtain the data rate detection result, and the bandwidth of the receiver is automatically adjusted according to the data rate detection result. Thus, it avoids the use of chip pins or information packets of the timing controller to control the bandwidth of the receiver. The performance of the display driver chip is optimized.

In the above-mentioned embodiments, the description of each embodiment has its own emphasis. For parts that are not described in detail in a certain embodiment, reference may be made to the relevant descriptions of other embodiments.

The receiver circuit and the receiver circuit control method in the embodiments of the present disclosure have been described in detail above. The principles and implementations of the present disclosure have been described with specific examples herein. The descriptions of the above embodiments are only for the purpose of helping to understand the technical solutions of the present disclosure and their core ideas. It should be understood by those of ordinary skill in the art that they can still modify the technical solutions described in the foregoing embodiments, or perform equivalent replacements to some of the technical features; and these modifications or replacements will not make the essence of the corresponding technical solutions deviate from the scope of the technical solutions of the embodiments of the present disclosure.

What is claimed is:

1. A receiver circuit, comprising:
   an analog front-end, configured to output a first signal;
   a clock & data recovery circuit, connected to the analog front-end and configured to lock the frequency of the first signal and output a frequency locking signal; and
   a detection circuit, respectively connected to the analog front-end and the clock recovery circuit, and configured to detect a data rate according to the frequency locking signal and output a bandwidth signal, a bias signal, and a completion signal according to the data rate detection result;
   wherein the bandwidth signal is used to adjust the bandwidth of the clock & data recovery circuit, the bias signal is used to adjust the bandwidth of the analog front-end, and the completion signal is used to control the clock & data recovery circuit to lock the phase of the first signal,
   wherein the detection circuit comprises:
   a first flip-flop, configured to output a second signal according to a power supply voltage signal, the first signal, and the frequency locking signal;
   a first logic gate, configured to output a third signal according to the second signal and an inverted signal;
   a timing circuit, configured to output a fourth signal according to the third signal;
   a second flip-flop, configured to output the completion signal according to the power supply voltage signal, the fourth signal, and the second signal;
   an inverter, configured to output the inverted signal according to the completion signal;
   a second logic gate, configured to output a clock count signal according to the first signal, the second signal, and the inverted signal; and
   a counter, configured to output a count value according to the clock count signal and the second signal, the count value being used to look up a table to obtain parameters of the bandwidth signal and the bias signal.

2. The receiver circuit according to claim 1, wherein the timing circuit comprises:
   a drive circuit, an input end of the drive circuit is connected to the third signal;
   a capacitor, one end of the capacitor is connected to an output end of the drive circuit and the other end of the capacitor is connected to a ground signal;
   a voltage source, one end of the voltage source is connected to the ground signal; and
   a comparator, a first input end of the comparator is connected to the other end of the voltage source, and a second input end of the comparator is connected to an output end of the drive circuit.

3. The receiver circuit according to claim 2, wherein the drive circuit comprises:
   a current source, one end of the current source is connected to the power supply voltage signal; and
   a first switch transistor and a second switch transistor, the gate of the first switch transistor and the gate of the second switch transistor being the input ends, the source of the first switch transistor and the drain of the second switch transistor being the output ends, the drain of the first switch transistor being connected to the other end of the current source, and the source of the second switch transistor being connected to the ground signal.

4. The receiver circuit according to claim 3, wherein the first switch transistor is a PMOS transistor and the second switch transistor is an NMOS transistor.

5. The receiver circuit according to claim 3, wherein:
when the third signal is at a first level, the first switch transistor is turned on, the second switch transistor is turned off, and the capacitor starts charging; and
when the third signal is at a second level, the first switch transistor is turned off, the second switch transistor is turned on, and the capacitor starts discharging.

6. The receiver circuit according to claim 1, wherein:
when the second signal is at a first level, the counter outputs a first count value which is used to obtain the bandwidth level of the bandwidth signal; and
when the second signal is at a second level, the counter starts counting and outputs a count value.

7. The receiver circuit according to claim 1, wherein:
when the frequency locking signal is at a first level, the detection circuit is reset; and
when the frequency locking signal is at a second level, the detection circuit detects the data rate.

8. A receiver circuit control method, applied to the receiver circuit of claim 1, comprising:
receiving a frequency locking signal output by a clock & data recovery circuit;
detecting, by a detection circuit, a data rate according to the frequency locking signal; and
outputting, by the detection circuit, a bandwidth signal, a bias signal, and a completion signal according to the data rate detection result, wherein the bandwidth signal is used to adjust the bandwidth of the clock & data recovery circuit, the bias signal is used to adjust the bandwidth of the analog front-end, and the completion signal is used to control the clock & data recovery circuit to lock the phase of the first signal,
wherein the detection circuit comprises:
a first flip-flop, configured to output a second signal according to a power supply voltage signal, the first signal, and the frequency locking signal;
a first logic gate, configured to output a third signal according to the second signal and an inverted signal;
a timing circuit, configured to output a fourth signal according to the third signal;
a second flip-flop, configured to output the completion signal according to the power supply voltage signal, the fourth signal, and the second signal;
an inverter, configured to output the inverted signal according to the completion signal;
a second logic gate, configured to output a clock count signal according to the first signal, the second signal, and the inverted signal; and
a counter, configured to output a count value according to the clock count signal and the second signal, the count value being used to look up a table to obtain parameters of the bandwidth signal and the bias signal.

9. The receiver circuit control method according to claim 8, further comprising:
when the completion signal is at a second level, cutting off the circuit path of the detection circuit.

10. The receiver circuit control method according to claim 8, wherein the timing circuit comprises:
a drive circuit, an input end of the drive circuit is connected to the third signal;
a capacitor, one end of the capacitor is connected to an output end of the drive circuit and the other end of the capacitor is connected to a ground signal;
a voltage source, one end of the voltage source is connected to the ground signal; and
a comparator, a first input end of the comparator is connected to the other end of the voltage source, and a second input end of the comparator is connected to an output end of the drive circuit.

11. The receiver circuit control method according to claim 10, wherein the drive circuit comprises:
a current source, one end of the current source is connected to the power supply voltage signal; and
a first switch transistor and a second switch transistor, the gate of the first switch transistor and the gate of the second switch transistor being the input ends, the source of the first switch transistor and the drain of the second switch transistor being the output ends, the drain of the first switch transistor being connected to the other end of the current source, and the source of the second switch transistor being connected to the ground signal.

12. The receiver circuit control method according to claim 11, wherein the first switch transistor is a PMOS transistor and the second switch transistor is an NMOS transistor.

13. The receiver circuit control method according to claim 11, wherein:
when the third signal is at a first level, the first switch transistor is turned on, the second switch transistor is turned off, and the capacitor starts charging; and
when the third signal is at a second level, the first switch transistor is turned off, the second switch transistor is turned on, and the capacitor starts discharging.

14. The receiver circuit control method according to claim 8, wherein:
when the second signal is at a first level, the counter outputs a first count value which is used to obtain the bandwidth level of the bandwidth signal; and
when the second signal is at a second level, the counter starts counting and outputs a count value.

15. The receiver circuit control method according to claim 8, wherein:
when the frequency locking signal is at a first level, the detection circuit is reset; and
when the frequency locking signal is at a second level, the detection circuit detects the data rate.

* * * * *